May 29, 1928.
M. POSER
1,671,313
LENS FOR HEADLIGHTS
Filed July 10, 1924
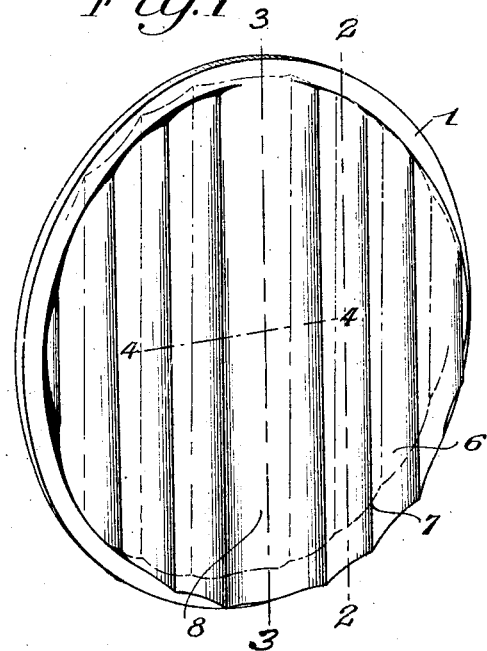
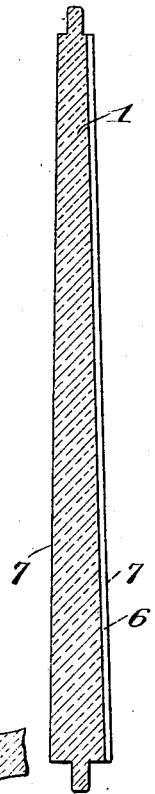
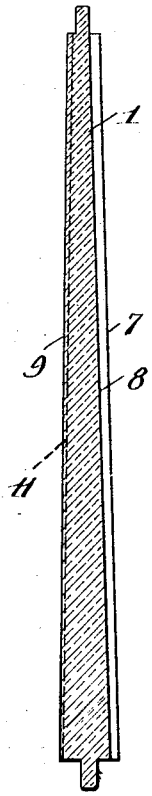
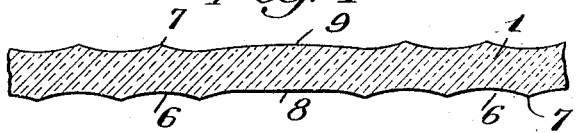
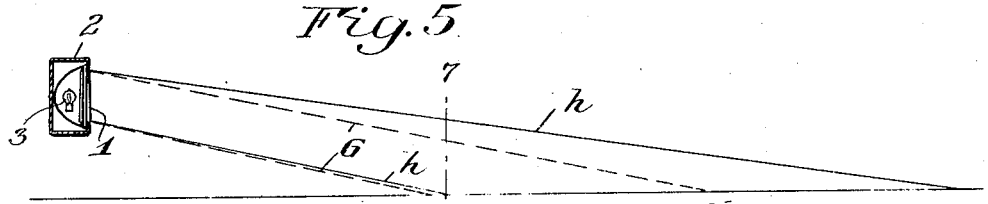
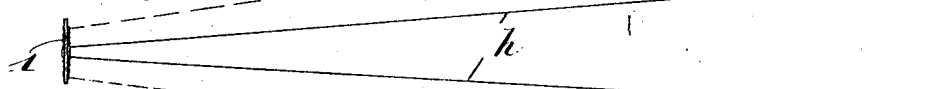
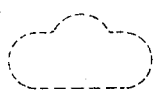
INVENTOR.
Max Poser
BY Frederick F. Church
his ATTORNEY Patented May 29, 1928.

1,671,313

UNITED STATES PATENT OFFICE.

MAX POSER, OF ROCHESTER, NEW YORK, ASSIGNOR TO BAUSCH & LOMB OPTICAL COMPANY, OF ROCHESTER, NEW YORK, A CORPORATION OF NEW YORK.

LENS FOR HEADLIGHTS.

Application filed July 10, 1924. Serial No. 725,135.

My invention relates to lenses for illuminating projectors particularly of the class used in connection with automobile headlights, and has for its object to provide a lens which will not only prevent projection of glaring rays above a predetermined level and properly control and distribute the light rays laterally through a wide angle without material loss and without dangerous glare, but will in addition cause the projection of an independent beam of light of lesser dispersion but of considerably greater intensity than the lateral beams thus illuminating the road surface at a greater distance ahead of the car than is possible with the lateral beam alone.

It is desirable in lenses particularly adapted for automobile headlights that the construction be such that the lenses may be readily formed and cleaned, and furthermore that the lateral rays be diffused practically uniformly and without the formation of unduly bright or dark areas appearing on the road.

My invention involves a modification or adaptation of the headlight lens forming the subject matter of Patent No. 1,486,720, whereby the above stated objects are accomplished. To these and other ends the invention consists in certain improvements and combinations of parts, all as will be hereinafter more fully described, the novel features being pointed out in the claims at the end of the specification.

In the accompanying drawing:

Figure 1 is a perspective view of a headlight lens embodying my improvements;

Figure 2 is a vertical sectional view of the same on the line 2—2 of Figure 1;

Figure 3 is a similar view on the line 3—3 of Figure 1;

Figure 4 is a horizontal section on the line 4—4 of Figure 1;

Figure 5 is a diagrammatic view looking from the side indicating the rays from the different portions of the lens;

Figure 6 is a plan view indicating in a manner similar to that shown in Figure 5 the light rays from the different portions of the lens;

Figure 7 is a diagrammatic view indicating in general the zones of illumination at say a point indicated by the line 7—7 in Figure 5.

Similar reference numerals throughout the several views indicate the same parts.

The lens 1 is adapted to be used in the front of an ordinary projecting lamp housing 2 provided with a suitable mirror or reflector which throws the beams from the lamp 3 in substantially horizontal and parallel rays. The body of the lens is generally prismoidal with the base of the prism at the bottom, with one or both of its faces at the sides of the central meridian or zone provided with grooves 6 forming a series of minus cylindrical lenses vertically extending, and in the event that the cylindrical or grooved surfaces are on opposite sides or faces of the lens as shown in Figure 4, the meeting line of the concave surfaces indicated at 7 are arranged between the concave surfaces on the opposite faces. The central portion of the lens instead of being grooved or fluted on one or both sides, is substantially flat on one surface as indicated at 8 and on the other is rounded from side to side as indicated at 9 forming in effect a plano-convex cylindrical lens extending from top to bottom of the structure. Instead of making the central portion or zone of a plano-convex cylindrical lens it might be made bi-convex of equal or unequal curves. The plano-convex or bi-convex cylindrical lens thus formed is preferably relatively narrow as compared with the whole width of the lens, comprising perhaps one-eighth of the entire width of the lens, and while in the general form of a prism cylinder with its base downward, the relative angles of its surfaces considered in vertical plane are not as great as that of the general vertical plane of the cylindrically grooved portions at the sides, such differences being indicated generally in Figure 3 in which the dotted line 11 indicates the general plane of the sides of the lens and the full line the general plane of the vertical surfaces of the central section. The surfaces of the central section merge gradually into the ridges formed on the front and rear surfaces of the lens, if both sides are grooved as shown, the general construction being indicated in Figure 4 of the drawing.

A lens constructed as described and placed in the lamp housing will cause the parallel rays from the lamp and reflector to be spread or astigmatized to avoid glare and to illuminate the side of the road, and will be at the same time refracted downwardly by the prismoidal form of the lens as a whole, these areas being indicated by the letter G, Figures 5 and 6, while the rays passing through a central portion of the lens are refracted downward by the prismoidal form to a lesser extent and will therefore strike the surface of the road a considerable distance forward and will not be spread laterally to so great an extent, nor will they be diffused as by the astigmatizing cylinders on either side of the above mentioned optical member; the rays from the central portion being indicated generally by $h$ in the diagrammatic view of Figures 5 and 6.

The general result obtained by this lens therefore is that while sufficient nonglaring rays are distributed at the sides of the road, the central beam although slightly divergent is not only refracted downward but carried to a considerably greater distance forward so that the maximum illumination may thus be obtained at a point where it is needed and where it will not interfere with the vision of the drivers of approaching vehicles, and will therefore provide a proper illumination under all conditions. The general pattern defined by the illuminated rays at a point such as indicated by the line 7—7 in Figure 5 would be substantially as shown in Figure 7, the central forwardly projected beam being of great intensity and the lateral beams more or less diffused but sufficiently intense for the purpose of side illumination and at the same time at a proper level so as not to interfere with the vision of approaching drivers.

While I prefer that the flat or plano surface of the central section of the lens be located at the outside of the casing, it will be understood that this could be reversed if desired, and also, as stated that where one or both of the surfaces of the lens could be provided with the astigmatizing cylinders, nevertheless I prefer that both such surfaces be so constructed, as it has been found in practice that the diffusion obtained is much better.

I claim as my invention:

1. A headlight lens prismoidal in vertical section with the base at the bottom, having a central vertical prismoidal positive cylindrical lens section with its base at the bottom, and the portions of the lens at the sides of said central section provided with a plurality of vertical cylindrical lenticular surfaces.

2. A headlight lens prismoidal in vertical section with the base at the bottom, having a central vertical prismoidal positive cylindrical lens section with its base at the bottom, and the portion of the lens at the sides of said central section provided with a plurality of vertical cylindrical lenticular surfaces, the prismatic angle of the central section being less than that of the portions of the sides thereof.

3. A headlight lens comprising central and lateral portions, both increasing uniformly in thickness from top to bottom to yield prismoidal vertical sections, said central portion having the form of a vertical prismoidal positive cylindrical lens section with its base at the bottom of said lens, said lateral prismoidal portions being each provided with a plurality of vertical negative cylindrical lenticular surfaces, the prismatic angle of the central portion being less than that of said lateral portions, so that said central portion serves to condense the light on the roadway proper in advance of the diffused illumination of said lateral portions.

MAX POSER.